(12) United States Patent
Shtern et al.

(10) Patent No.: US 12,084,539 B2
(45) Date of Patent: Sep. 10, 2024

(54) POLYISOCYANATE COMPOSITION, A POLYURETHANE FOAM OBTAINED THEREFROM AND USE THEREOF

(71) Applicant: BASF SE, Ludwigshafen am Rhein (DE)

(72) Inventors: David Shtern, Wyandotte, MI (US); Michael J Krupa, Wyandotte, MI (US)

(73) Assignee: BASF SE, Ludwigshafen am Rhein (DE)

( * ) Notice: Subject to any disclaimer, the term of this patent is extended or adjusted under 35 U.S.C. 154(b) by 83 days.

(21) Appl. No.: 17/268,562

(22) PCT Filed: Aug. 8, 2019

(86) PCT No.: PCT/EP2019/071282
§ 371 (c)(1),
(2) Date: Feb. 15, 2021

(87) PCT Pub. No.: WO2020/035382
PCT Pub. Date: Feb. 20, 2020

(65) Prior Publication Data
US 2021/0317256 A1    Oct. 14, 2021

(30) Foreign Application Priority Data
Oct. 4, 2018 (EP) ..................... 18198597

(51) Int. Cl.
*C08G 18/50* (2006.01)
*C08G 18/76* (2006.01)
*C08J 9/14* (2006.01)
*C08G 101/00* (2006.01)

(52) U.S. Cl.
CPC ..... *C08G 18/5096* (2013.01); *C08G 18/7664* (2013.01); *C08J 9/146* (2013.01); *C08G 2101/00* (2013.01); *C08J 2203/162* (2013.01); *C08J 2207/04* (2013.01); *C08J 2375/08* (2013.01)

(58) Field of Classification Search
CPC .... C08G 18/10; C08G 18/48; C08G 18/5096; C08G 18/7664; C08G 18/7671; C08G 2101/00; C08J 9/146; C08J 2203/162; C08J 2207/04; C08J 2375/04; C08J 2375/06; C08J 2375/08
See application file for complete search history.

(56) References Cited

U.S. PATENT DOCUMENTS

| 2011/0288192 A1* | 11/2011 | Van Horn | C08J 9/149 |
| | | | 521/88 |
| 2016/0130416 A1* | 5/2016 | Chen | C08J 9/0061 |
| | | | 521/128 |
| 2017/0313806 A1* | 11/2017 | Yu | C08G 18/18 |

FOREIGN PATENT DOCUMENTS

| EP | 1156077 A1 | 11/2001 |
| EP | 1544235 A1 | 6/2005 |

OTHER PUBLICATIONS

International Search Report and Written Opinion for Corresponding PCT/EP2019/071282 mailed Nov. 12, 2019 10 Pages.
"Foams and Foamable Compositions Containing Halogenated Olefin Blowing Agents", ip.com Journal, ip.com Inc., West Henrietta, NY, US, May 5, 2014 (May 5, 2014).

* cited by examiner

*Primary Examiner* — John M Cooney
(74) *Attorney, Agent, or Firm* — Grüneberg and Myers PLLC

(57) ABSTRACT

Described herein is an isocyanate composition, a polyurethane foam obtained therefrom and a method of using the polyurethane foam in an article.

13 Claims, No Drawings

POLYISOCYANATE COMPOSITION, A POLYURETHANE FOAM OBTAINED THEREFROM AND USE THEREOF

CROSS-REFERENCE TO RELATED APPLICATIONS

This application is a U.S. National Phase Application of International Patent Application No. PCT/EP2019/071282, filed Aug. 8, 2019, which claims the benefit of priority to U.S. Provisional Patent Application No. 62/764,928, filed Aug. 16, 2018, and which claims the benefit of priority to European Patent Application No. 18198597.9, filed Oct. 4, 2018, the entire contents of which are hereby incorporated by reference herein.

FIELD OF INVENTION

The presently claimed invention relates to an isocyanate composition, a polyurethane foam obtained therefrom and the use thereof in an article.

BACKGROUND OF THE INVENTION

Polyurethane foam, also referred to as PU foam, has been extensively used in various applications, such as but not limited to, buildings, transportation and appliance industries. The existing techniques for preparing the PU foam require exothermic interaction of a polyol component and an isocyanate component, i.e. a reaction mixture. Commercially, the polyol component, which includes a mixture of polyols, blowing agents, catalysts and other components, is supplied as a B-side component. The isocyanate component, which is reacted with the polyol composition, is supplied as an A-side component. The A-side component and the B-side components together form the reaction mixture for a two-component PU foam system.

In this regard, EP 1 156 077 A1 describes a process for preparing rigid PU foams using a surfactant composition comprising at least a first moderate surfactant and at least a second weak surfactant according to a weight ratio first:second ranging from 1:25 to 5:1. Another, EP 1 544 235 A1 describes a method for making a rigid PU foam employing a C4 or C5 hydrocarbon blowing agent, or mixtures thereof, and a silicone surfactant comprising a polyetherpolysiloxane copolymer represented by a specific formula and having the total surfactant molecular weight, based on the formula, of 7000-30,000 g/mol, wt % siloxane in the surfactant of 32 to 70 wt %, the blend average molecular weight (BAMW) of the polyether portion of 450-1000 g/mole, and the mole % of ethylene oxide in the polyether portion of 70-100 mole %.

Expansion in the PU foam systems is essentially carried out using blowing agents. Extensively used blowing agents such as chlorofluorocarbons (CFCs), one of the key ingredients for PU foams, have been subject to several restrictions due to environmental concerns. It was long-known that CFCs have a high ozone depleting potential and a very high global warming potential. The next generation of blowing agents were hydrochlorofluorocarbons (HCFCs), which were also eventually phased out with a transition to hydrofluorocarbons (HFCs), which are known to be non-ozone depleting, but still have a high global warming potential.

However, due to the recent legislations, HFCs are being phased out in an attempt to achieve compositions with low global warming potential and no ozone depletion effect. One of the promising replacements are Hydrofluoroolefins (HFOs). These HFOs are in general known, for instance from U.S. Pat. No. 9,714,304 B2.

These blowing agents have severe limitations when used in the polyol component. One such limitation is the storage stability of the polyol component. In the present context, "storage stability" is demonstrated by chemical stability and phase stability. While the chemical composition and the reactivity profile determine the chemical stability, the shelf life is used as an indication for determining the phase stability of the reaction mixture and/or the resulting PU foam.

The presence of these blowing agents in the polyol components can lead to a significantly altered reaction profile and to foams of significantly lower quality or even to the collapse of the foam. The poor shelf life is caused by the decomposition of the blowing agents in the polyol component. This results in a considerable reduction in the shelf life, which sometimes becomes even less than six months. Further, the existing processes for producing the PU foams are complex and not reproducible, thereby resulting in unacceptable mechanical and thermal-insulating properties of the PU foams.

It was, therefore, an object of the presently claimed invention to provide an isocyanate composition which is storage stable and has an acceptable shelf life of more than six months and provides for an easy and reproducible process for producing PU foams while maintaining their advantageous mechanical and thermal-insulating properties.

SUMMARY OF THE INVENTION

Surprisingly, it has been found that the above object is met by providing an isocyanate composition comprising a first blowing agent and at least one moderate and/or weak surfactant which does not contain any reactive functional group towards NCO.

Accordingly, in one aspect, the presently claimed invention is directed to an isocyanate composition comprising:
(a) at least one isocyanate,
(b) a first blowing agent, and
(c) at least one surfactant,
wherein the surfactant does not contain any reactive functional group towards NCO and has a Dynamic Surface Tension (DST) in between 40 mN/m to 60 mN/m, when measured at a concentration of 0.1 wt.-% and frequency of 1 Hz in distilled water, and wherein the first blowing agent has a boiling point in between −50° C. to 5° C.

In another aspect, the presently claimed invention is directed to a PU foam obtained by reacting:
(A) the above defined isocyanate composition, and
(B) a polyol composition,
in the presence of
(C) a second blowing agent, and
(D) at least one catalyst.

In another aspect, the presently claimed invention is directed to a process for preparing the above defined PU foam.

In another aspect, the presently claimed invention is directed to a reinforced PU foam obtained by reacting:
(A) the above defined isocyanate composition, and
(B) a polyol composition,
in the presence of a reinforcing agent.

In another aspect, the presently claimed invention is directed to a process for producing a spray PU foam comprising the steps of:

(S1) spraying a reaction mixture comprising:
    (i) the above defined isocyanate composition, and
    (ii) a resin mixture comprising a polyol composition, and
(S2) allowing the reaction mixture to react.

In another aspect, the presently claimed invention is directed to the use of the spray PU foam obtained from the above defined process in an article.

In another aspect, the presently claimed invention is directed to an article comprising the spray PU foam obtained from the above defined process.

DETAILED DESCRIPTION OF THE INVENTION

Before the present compositions and formulations of the invention are described, it is to be understood that this invention is not limited to particular compositions and formulations described, since such compositions and formulation may, of course, vary. It is also to be understood that the terminology used herein is not intended to be limiting, since the scope of the presently claimed invention will be limited only by the appended claims.

The terms "comprising", "comprises" and "comprised of" as used herein are synonymous with "including", "includes" or "containing", "contains", and are inclusive or open-ended and do not exclude additional, non-recited members, elements or method steps. It will be appreciated that the terms "comprising", "comprises" and "comprised of" as used herein comprise the terms "consisting of", "consists" and "consists of".

Furthermore, the terms "first", "second", "third" or "(a)", "(b)", "(c)", "(d)" etc. and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein. In case the terms "first", "second", "third" or "(A)", "(B)" and "(C)" or "(a)", "(b)", "(c)", "(d)", "i", "ii" etc. relate to steps of a method or use or assay there is no time or time interval coherence between the steps, that is, the steps may be carried out simultaneously or there may be time intervals of seconds, minutes, hours, days, weeks, months or even years between such steps, unless otherwise indicated in the application as set forth herein above or below.

In the following passages, different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

Reference throughout this specification to "one embodiment" or "an embodiment" means that a particular feature, structure or characteristic described in connection with the embodiment is included in at least one embodiment of the presently claimed invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the invention, and form different embodiments, as would be understood by those in the art. For example, in the appended claims, any of the claimed embodiments can be used in any combination.

Furthermore, the ranges defined throughout the specification include the end values as well, i.e. a range of 1 to 10 implies that both 1 and 10 are included in the range. For the avoidance of doubt, the applicant shall be entitled to any equivalents according to applicable law.

For the purposes of the presently claimed invention, the terms "polyester polyol" and "polyesterol", and also the terms "polyether polyol" and "polyetherol", are synonymous. Further, the term "storage stable" refers to the absence of any phase separation in the isocyanate composition, which prevents the PU foam from collapsing. Phase separation is determined visually by mixing the components of the isocyanate composition and is evident within a period of up to 15 days.

An aspect of the presently claimed invention is directed to an isocyanate composition comprising:
(a) at least one isocyanate,
(b) a first blowing agent, and
(c) at least one surfactant,
wherein the surfactant does not contain any reactive functional group towards NCO and has a Dynamic Surface Tension (DST) in between 40 mN/m to 60 mN/m, when measured at a concentration of 0.1 wt.-% and frequency of 1 Hz in distilled water, and wherein the first blowing agent has a boiling point in between −50° C. to 5° C.

In one embodiment, the isocyanate has an average functionality of at least 2.0, or in between 2.0 to 3.0. These isocyanates are aliphatic isocyanates or aromatic isocyanates or a combination thereof. By the term "aromatic isocyanate", it is referred to molecules having two or more isocyanate groups attached directly and/or indirectly to the aromatic ring. Further, it is to be understood that the isocyanate includes both monomeric and polymeric forms of the aliphatic and aromatic isocyanate. By the term "polymeric", it is referred to the polymeric grade of the aliphatic and/or aromatic isocyanate comprising, independently of each other, different oligomers and homologues.

In one embodiment, the isocyanate is an aromatic isocyanate comprising one or more selected from toluene diisocyanate; polymeric toluene diisocyanate, methylene diphenyl diisocyanate; polymeric methylene diphenyl diisocyanate; m-phenylene diisocyanate; 1,5-naphthalene diisocyanate; 4-chloro-1; 3-phenylene diisocyanate; 2,4,6-toluylene triisocyanate, 1,3-diisopropylphenylene-2,4-diisocyanate; 1-methyl-3,5-diethylphenylene-2,4-diisocyanate; 1,3,5-triethylphenylene-2,4-diisocyanate; 1,3,5-triisoproply-phenylene-2,4-diisocyanate; 3,3'-diethyl-bisphenyl-4,4'-diisocyanate; 3,5,3',5'-tetraethyl-diphenylmethane-4,4'-diisocyanate; 3,5,3',5'-tetraisopropyldiphenylmethane-4,4'-diisocyanate; 1-ethyl-4-ethoxy-phenyl-2,5-diisocyanate; 1,3,5-triethyl benzene-2,4,6-triisocyanate; 1-ethyl-3,5-diisopropyl benzene-2,4,6-triisocyanate, tolidine diisocyanate, 1,3,5-triisopropyl benzene-2,4,6-triisocyanate and mixtures thereof. In other embodiments, the aromatic isocyanates comprise one or more selected from toluene diisocyanate; polymeric toluene diisocyanate, methylene diphenyl diisocyanate; polymeric methylene diphenyl diisocyanate, m-phenylene diisocyanate; 1,5-naphthalene diisocyanate; 4-chloro-1; 3-phenylene diisocyanate; 2,4,6-toluylene triisocyanate, 1,3-diisopropylphenylene-2,4-diisocyanate and 1-methyl-3,5-dieth-ylphenylene-2,4-diisocyanate or a combination thereof. In another embodiment, the aromatic isocyanates comprise one or more selected from toluene diisocyanate; polymeric toluene diisocyanate, methylene diphenyl diisocyanate; polymeric methylene diphenyl diisocyanate, m-phenylene diisocyanate and 1,5-naphthalene diisocyanate or a combination thereof. In other embodiment, the aromatic isocyanates comprise one or more selected from toluene diisocyanate; polymeric toluene diisocyanate, methylene diphenyl diisocyanate and polymeric methylene diphenyl diisocyanate or a combination thereof. In still other embodiment, the aromatic isocyanate is methylene diphenyl diisocyanate and/or polymeric methylene diphenyl diisocyanate.

Methylene diphenyl diisocyanate (MDI) is available in three different isomeric forms, namely 2,2'-methylene diphenyl diisocyanate (2,2'-MDI), 2,4'-methylene diphenyl diisocyanate (2,4'-MDI) and 4,4'-methylene diphenyl diisocyanate (4,4'-MDI). MDI can be classified into mono-meric- and polymeric-MDI. Polymeric MDI is a mixture of MDI having two rings and MDI homologs having a larger number of rings, examples being homologs having 3, 4 or 5 rings, i.e. isocyanates of functionality 3, 4 or 5. Polymeric MDI can be used together with other diisocyanates conventionally used in polyurethane chemistry, for example toluene diisocyanate (TDI) or naphthalene diisocyanate (NDI). The isomeric ratio as well as the amount of oligomeric species can vary in wide ranges in these products. For instance, polymeric methylene diphenyl diisocyanate may typically contain about 30 to 80 wt. % of methylene diphenyl diisocyanate isomers, the balance being said oligomeric species. In one embodiment, a mixture of 4,4'-methylene diphenyl diisocyanate containing oligomers, 2,4'-methylene diphenyl diisocyanate and 2,2'-methylene diphenyl diisocyanate can be used.

In an embodiment, the viscosity of the isocyanates here at 25° C. is in between 50 mPas to 1000 mPas, or in between 100 mPas to 800 mPas, or in between 100 mPas to 600 mPas, or even in between 150 mPas to 400 mPas, determined according to ASTM D2196-15. For instance, a Brookfield Viscometer DV2T with spindle number 2 at 30 rpm can be used for determining the viscosity, as per ASTM D2196-15.

In addition, reaction products of the polyisocyanates with polyhydric polyols and their mixtures with other diisocyanates and polyisocyanates can also be used.

In another embodiment, the aliphatic isocyanate can comprise 6 to 100 carbon atoms linked in a straight chain or cyclized and having two or more isocyanate groups. In one embodiment, the aliphatic isocyanate comprise one or more selected from tetramethylene 1,4-diisocyanate, pentamethylene 1,5-diisocyanate, hexamethylene 1,6-diisocyanate, decamethylene diisocyanate, 1,12-dodecane diisocyanate, 2,2,4-trimethyl-hexamethylene diisocyanate, 2,4,4-trimethyl-hexamethylene diisocyanate, 2-methyl-1,5-pentamethylene diisocyanate, cy-clobutane-1,3-diisocyanate, 1,2-, 1,3- and 1,4-cyclohexane diisocyanates, 2,4- and 2,6-methylcyclohexane diisocyanate, 4,4'- and 2,4'-dicyclohexyldiisocyanates, 1,3,5-cyclohexane triisocyanates, isocyanatomethylcyclohexane isocyanates, isocyanatoethylcyclohexane isocyanates, bis(isocyanatomethyl)-cyclohexane diisocyanates, 4,4'-diisocyanatodicyclohexylmethane, pentamethylene 1,5-diisocyanate and, isophorone diisocyanate. Mixtures of aliphatic isocyanates can likewise be also used.

Any of the physical blowing agents can be used for the presently claimed invention as the first blowing agent. In one embodiment, the first blowing agent is a low boiling blowing agent having a boiling point in between −40° C. to 5° C., or in between −30° C. to 5° C., or even in between −20° C. to 5° C.

In another embodiment, the first blowing agent comprises one or more selected from hydrocarbons, hydrofluorocarbons, hydrofluoroolefins, hydrochlorofluorocarbons, hydrochlorofluoroolefins, fluorocarbons, dialkyl ethers, cycloalkylene ethers and ketones and fluorinated ethers.

Examples of suitable hydrochlorofluorocarbons include 1-chloro-1,2-difluoroethane, 1-chloro-2,2-difluoroethane, 1-chloro-1,1-difluoroethane, 1,1-dichloro-1-fluoroethane and monochlorodifluoromethane.

Examples of suitable hydrofluorocarbons include 1,1,1,2-tetrafluoroethane (HFC 134a), 1,1,2,2-tetrafluoroethane, trifluoromethane, heptafluoropropane, 1,1,1-trifluoroethane, 1,1,2-trifluoroethane, 1,1,1,2,2-pentafluoropropane, 1,1,1,3-tetrafluoropropane, 1,1,1,3,3-pentafluoropropane (HFC 245fa), 1,1,3,3,3-pentafluoropropane, 1,1,1,3,3-pentafluoro-n-butane (HFC 365mfc), 1,1,1,4,4,4-hexafluoro-n-butane, 1,1,1,2,3,3,3-heptafluoropropane (HFC 227ea) and mixtures of any of the above.

Suitable hydrocarbon blowing agents include lower aliphatic or cyclic, linear or branched hydrocarbons such as alkanes, alkenes and cycloalkanes, having from 4 to 8 carbon atoms.

Specific examples include n-butane, iso-butane, 2,3-dimethylbutane, cyclobutane, n-pentane, iso-pentane, technical grade pentane mixtures, cyclopentane, methylcyclopentane, neopentane, n-hexane, iso-hexane, n-heptane, iso-heptane, cyclohexane, methylcyclohexane, 1-pentene, 2-methylbutene, 3-methylbutene, 1-hexene and any mixture of the above. In one embodiment, hydrocarbons are selected from n-butane, iso-butane, cyclopentane, n-pentane and isopentane and any mixture thereof, in particular mixtures of n-pentane and isopentane, mixtures of cyclopentane and isobutane, mixtures of cyclopentane and n-butane and mixtures of cyclopentane and iso- or n-pentane.

Generally, water or other carbon dioxide-evolving compounds are used together with the physical blowing agents. Where water is used as chemical co-blowing agent, typical amounts of water are in the range from 0.2 wt.-% to 5 wt.-%, based on the total weight of the isocyanate composition.

Hydrofluoroolefins (HFOs), also known as fluorinated alkenes, that are suitable according to the presently claimed invention, are propenes, butenes, pentenes and hexenes having 3 to 6 fluorine substituents, while other substituents such as chlorine can be present, examples being tetrafluoropropenes, fluorochloropropenes, for example trifluoromonochloropropenes, pentafluoropropenes, fluorochlorobutenes, hexafluorobutenes or mixtures thereof.

In one embodiment, HFOs comprise one or more selected from 1,1,1,3-tetrafluoropropene, 1,1,1,3-tetrafluoropropene, 1,1,1-trifluoro-2-chloropropene, 1-chloro-3,3,3-trifluoropropene, 1,1,1,2,3-pentafluoropropene, 1,1,1,4,4,4-hexafluorobutene, 1-bromopentafluoropropene, 2-bromopentafluoropropene, 3-bromopentafluoropropene, 1,1,2,3,3,4,4-heptafluoro-1-butene, 3,3,4,4,5,5,5-heptafluoro-1-pentene, 1-bromo-2,3,3,3-tetrafluoropropene, 2-bromo-1,3,3,3-tetrafluoropropene, 3-bromo-1,1,3,3-tetrafluoropropene, 2-bromo-3,3,3-trifluoropropene, E-1-bromo-3,3,3-trifluoropropene, 3,3,3-trifluoro-2-(trifluoromethyl)propene, 1-chloro-3,3,3-trifluoropropene, 2-chloro-3,3,3-trifluoropropene and 1,1,1-trifluoro-2-butene, in cis or trans form.

In another embodiment, HFOs comprise one or more selected from 1,1,1,3-tetrafluoropropene, 1,1,1,3-tetrafluoropropene, 1,1,1-trifluoro-2-chloropropene, 1-chloro-3,3,3-trifluoropropene, 1,1,1,2,3-pentafluoropropene, 1,1,1,4,4,4- hexafluorobutene, 1-bromopentafluoropropene, 2-bromopentafluoropropene, 3-bromopentafluoropropene and 1,1,2,3,3,4,4-heptafluoro-1-butene, in cis or trans form.

In still another embodiment, HFOs comprise of one or more selected from 1,1,1,3-tetrafluoropropene, 1,1,1,3-tetrafluoropropene, 1,1,1-trifluoro-2-chloropropene, 1-chloro-3,3,3-trifluoropropene, 1,1,1,2,3-pentafluoropropene and 1,1,1,4,4,4-hexafluorobutene, in cis or trans form.

In yet another embodiment, the first blowing agent is trans-1,1,1,3-tetrafluoropropene, also known as HFO-1234ze(E). HFO-1234ze(E) is also commercially available under the tradename Solstice® from Honeywell.

Suitable amounts of the first blowing agent are in between 1.0 wt.-% to 30 wt.-%, or in between 1.5 wt.-% to 20 wt.-%, or in between 3.0 wt.-% to 15 wt.-%, or in between 5.0 wt.-% to 15 wt.-%, or even in between 5.0 wt.-% to 10 wt.-% based on the total weight of the isocyanate composition.

In an embodiment, the isocyanate composition, as described hereinabove, also comprises at least one surfactant. For the purpose of the presently claimed invention, the surfactant does not contain any reactive functional group towards NCO and has a Dynamic Surface Tension (DST) in between 40 mN/m to 60 mN/m, when measured at a concentration of 0.1 wt.-% and frequency of 1 Hz in distilled water. In another embodiment, the surfactant does not contain any free hydroxyl groups and has a Dynamic Surface Tension (DST) in between 40 mN/m to 60 mN/m, when measured at a concentration of 0.1 wt.-% and frequency of 1 Hz in distilled water.

In an embodiment, the surfactant has a Dynamic Surface Tension (DST) in between 40 mN/m to 60 mN/m, when measured at a concentration of 0.1 wt.-% and frequency of 1 Hz in distilled water. In other embodiment, the DST is in between 45 mN/m to 60 mN/m, or in between 50 mN/m to 57 mN/m, or even in between 52 mN/m to 55 mN/m.

In another embodiment, the surfactant has a Dynamic Surface Tension (DST) in between 45 mN/m to 60 mN/m, when measured at a concentration of 1.0 wt.-% and frequency of 1 Hz in distilled water. In other embodiment, the Dynamic Surface Tension (DST) is in between 47 mN/m to 55 mN/m, or in between 47 mN/m to 53 mN/m, or even in between 49 mN/m to 52 mN/m.

For the purpose of DST measurements, the surfactant is mixed with distilled water in a suitable measuring instrument at different concentrations. One such suitable measuring instrument is a SITA Tensiometer. The temperature of the instrument is controlled at 21±2° C. The concentrations can be kept at 0.1 wt.-%, 1.0 wt.-% and 100 wt.-% for silicone based. Bubbles are generated at different bubble frequencies and the difference between the maximum pressures measured inside both bubbles is converted into surface tension.

DST measurement, as described hereinabove, classifies the surfactants, from strong to moderate to weak. The weak and moderate surfactants are surfactants that decrease the surface tension, especially at long bubble age, in contrast to a strong surfactant that decreases the surface tension, even at short bubble age. Typically, the weak and moderate surfactants have a Dynamic Surface Tension (DST) in between 40 mN/m to 60 mN/m, when measured at a concentration of 0.1 wt.-% and frequency of 1 Hz in distilled water.

In one embodiment, the at least one surfactant is a non-ionic surfactant. In one embodiment, the non-ionic surfactant comprises a polyether polysiloxane or a polyether siloxane or a mixture thereof.

In an embodiment, the non-ionic surfactant comprises the polyether polysiloxane represented by the general formula (I),

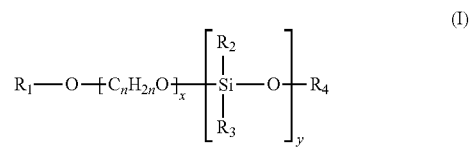

wherein,
$R_1$, $R_2$, $R_3$ and $R_4$ is, independent of each other, selected from unsubstituted alkyl, alkenyl, cycloalkyl, aryl, heteroaryl, alkylalkoxy, $R_9$—C(=O)—, $R_{10}$—NH—C(=O)—, $R_{11}Si(R_{12})(R_{13})$—, $R_{14}$—O—(—$R_{15}$—O—)$_j$—$(C_nH_{2n}$—$)_k$—;
$R_9$, $R_{10}$, $R_{11}$, $R_{12}$, and $R_{13}$ is, independent of each other, selected from alkyl, alkenyl, cycloalkyl, aryl, heteroaryl, alkylalkoxy;
$R_{14}$ and $R_{15}$ is, independent of each other, selected from bivalent alkylene, cycloalkylene, alkenyl, aryl;
n is an integer in between 1 to 10;
j and k is, independent of each other, an integer in between 0 to 10; and
x and y is, independent of each other, an integer in between 1 to 10000.

The term "alkyl" herein refers to an acyclic saturated aliphatic group including linear or branched alkyl saturated hydrocarbon radical denoted by a general formula $C_pH_{2p+1}$ and wherein p denotes the number of carbon atoms such as 1, 2, 3, 4 etc.

In one embodiment, alkyl refers to an unsubstituted, linear or branched, $C_1$-$C_{30}$ alkyl group. The unsubstituted linear $C_1$-$C_{30}$ alkyl comprises methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, henicosyl, docosyl, tricosyl, tetracosyl, pentacosyl, hexacosyl, heptacosyl, octacosyl, noncosyl and triacontyl. In one embodiment, it comprises of methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl and eicosyl.

The term "alkenyl" refers to an unsubstituted, linear acyclic unsaturated aliphatic group including a linear alkenyl unsaturated hydrocarbon radical denoted by a general formula $C_pH_{2p-1}$ and wherein p denotes the number of carbon atoms such as 1, 2, 3, 4 etc.

In one embodiment, alkenyl refers to an unsubstituted linear $C_2$-$C_{30}$ alkenyl comprising of 1-propenyl, 1-butenyl, 1-pentenyl, 1-hexenyl, 2-hexenyl, 1-heptenyl, 2-heptenyl, 1-octenyl, 2-octenyl, 1-nonenyl, 2-nonenyl, 1-decenyl, 2-decenyl, 1-undecenyl, 2-undecenyl, 1-dodecenyl, 2-dodecenyl, 1-tridecenyl, 2-tridecenyl, 1-tetradecenyl, 2-tetradecenyl, 1-pentadecenyl, 2-pentadecenyl, 1-hexadecenyl, 2-hexadecenyl, 1-heptadecenyl, 2-heptadecenyl, 1-octadecenyl, 2-octadecenyl, 1-nonadecenyl, 2-nonadecenyl, 1-eicosenyl, 2-eicosenyl, 2-henicosenyl, 2-docosenyl, 2-tricosenyl, 2-tetracosenyl, 2-pentacosenyl, 2-hexacosenyl, 2-octacoenyl, 2-nonacosenyl and 2-triacontenyl. In another embodiment, it comprises of 1-propenyl, 1-butenyl, 1-pentenyl, 1-hexenyl, 2-hexenyl, 1-heptenyl, 2-heptenyl, 1-octenyl, 2-octenyl, 1-nonenyl, 2-nonenyl, 1-decenyl, 2-decenyl, 1-undecenyl, 2-undecenyl, 1-dodecenyl, 2-dodecenyl, 1-tridecenyl, 2-tridecenyl, 1-tetradecenyl, 2-tetradecenyl, 1-pentadecenyl, 2-pentadecenyl, 1-hexadecenyl, 2-hexadecenyl, 1-heptadecenyl, 2-heptadecenyl and 1-octadecenyl. In another embodiment, unsubstituted linear $C_2$-$C_{30}$ alkenyl comprises 1-propenyl, 1-butenyl, 1-pentenyl, 1-hexenyl, 2-hexenyl, 1-heptenyl, 2-heptenyl, 1-octenyl, 2-octenyl, 1-nonenyl, 2-nonenyl, 1-decenyl, 2-decenyl, 1-undecenyl, 2-undecenyl, 1-dodecenyl, 2-dodecenyl, 1-tridecenyl, 2-tridecenyl, 1-tetradecenyl, 2-tetradecenyl, 1-pentadecenyl and 2-pentadecenyl. In yet another embodiment, unsubstituted linear $C_2$-$C_{30}$ alkenyl comprises 1-propenyl, 1-butenyl, 1-pentenyl, 1-hexenyl, 2-hexenyl, 1-heptenyl and 2-heptenyl.

The term "cycloalkyl" refers to an unsubstituted or branched $C_3$-$C_{10}$ cycloalkyl having a monocyclic or bicyclic 3 to 10 membered saturated cycloaliphatic radical. The unsubstituted or branched $C_3$-$C_{10}$ cycloalkyl is a monocyclic or bicyclic $C_3$-$C_{10}$ compound. The representative examples of unsubstituted or branched $C_3$-$C_{10}$ monocyclic and bicyclic cycloalkyl comprise cyclopropyl, cyclobutyl, cyclopentyl, cyclohexyl, cycloheptyl, bicyclo[2.2.1]heptyl and bicyclo[3.1.1]heptyl. The $C_3$-$C_{10}$ monocyclic and bicyclic cycloalkyl can be further branched with one or more equal or different alkyl groups, as described hereinabove. The representative examples of branched $C_3$-$C_{10}$ monocyclic and bicyclic cycloalkyl include, but are not limited to, methyl cyclohexyl, dimethyl cyclohexyl etc.

The term "aryl" refers to a monocyclic, bicyclic or tricyclic hydrocarbon ring system having preferably 6 to 14 carbon atoms, wherein at least one carbocyclic ring is having a $4p+2\pi$-electron system, wherein 'p' is the number of aromatic rings. An aryl moiety may be unsubstituted, monosubstituted or identically or differently polysubstituted. Examples of aryl moieties include, but are not limited to, phenyl, 1-naphthyl, 2-naphthyl or anthracenyl.

The term "heteroaryl" refers to an aromatic monocyclic, bicyclic or a tricyclic hydrocarbon having 5, 6, 7, 8, 9, 10, 11, 12, 13 or 14 carbon atoms, or even 5, 6, 9 or 10 atoms, in which one to four carbon atoms are replaced by identical or different heteroatoms including oxygen, sulfur and nitrogen. Heteroaryl moieties may comprise 1, 2, 3, 4 or 5, or 1, 2, or 3, heteroatoms independently selected from oxygen, sulfur and nitrogen. A heteroaryl moiety may be unsubstituted or monosubstituted or identically or differently polysubstituted. Representative examples of suitable heteroaryl moieties comprise furyl, pyridyl, oxazolyl, thiazolyl, pyrazolyl, pyrimidinyl, pyrrolyl, isooxazolyl, triazolyl, tetrazolyl, pyridazinyl, isothiazolyl, benzothiazolyl, benzooxazolyl, benzimidazolyl, quinolinyl and isoquinolinyl.

The term "alkylene" refers to acyclic saturated hydrocarbon chains, which combine different moieties. Representative examples of the alkylene groups comprise —$CH_2$—$CH_2$—, —$CH_2$—$CH(CH_3)$—, —$CH_2$—$CH(CH_2CH_3)$—, —$CH_2$—$CH(n\text{-}C_3H_7)$—, —$CH_2$—$CH(n\text{-}C_4H_9)$—, —$CH_2$—$CH(n\text{-}C_5H_{11})$—, —$CH_2$—$CH(n\text{-}C_6H_{13})$—, —$CH_2$—$CH(n\text{-}C_7H_{15})$—, —$CH_2$—$CH(n\text{-}C_8H_{17})$—, —$CH(CH_3)$—$CH(CH_3)$—, —$(CH_2)_3$—, —$(CH_2)_4$—, —$(CH_2)_5$—, —$(CH_2)_6$—, —$(CH_2)_8$—, —$(CH_2)_{10}$—, —$C(CH_3)_2$—, —$CH_2$—$C(CH_3)_2$—$CH_2$—, and —$CH_2$—[$C(CH_3)_2$]$_2$—$CH_2$—. In one embodiment, $C_2$-$C_{10}$ alkylene comprises one or more of —$CH_2$—$CH_2$—, $CH_2$—$CH(CH_3)$—, —$CH_2$—$CH(CH_2CH_3)$—, —$CH_2$—$CH(n\text{-}C_3H_7)$—, —$CH_2$—$CH(n\text{-}C_4H_9)$—, —$CH_2$—$CH(n\text{-}C_6H_{13})$—, and —$(CH_2)_4$—.

In one embodiment, the non-ionic surfactant consists of the polyether polysiloxane of general formula (I), as described hereinabove.

In one embodiment, the polyether polysiloxane is represented by the general formula (I)(a),

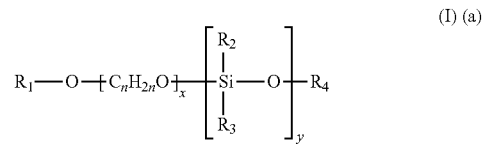

(I)(a)

wherein, $R_1$, $R_2$, $R_3$ and $R_4$ is, independent of each other, selected from alkyl, alkenyl and $R_{14}$—O—(—$R_{15}$—O—)$_j$—($C_nH_{2n}$—)$_k$—;

$R_{14}$ and $R_{15}$ is, independent of each other, selected from bivalent alkylene, cycloalkylene, alkenyl, aryl;

n is an integer in between 1 to 10;

j and k is, independent of each other, an integer in between 0 to 10; and x and y is, independent of each other, an integer in between 1 to 10000.

In one embodiment, $R_2$ and $R_3$ is, independent of each other, an alkyl comprising methyl, ethyl, propyl, butyl, pentyl, hexyl, heptyl, octyl, nonyl and decyl. In another embodiment, it comprises of methyl, ethyl, propyl, butyl, pentyl and hexyl. In still another embodiment, $R_2$ and $R_3$ are identical and comprise methyl, ethyl, propyl, butyl, pentyl and hexyl. In yet another embodiment, $R_2$ and $R_3$ comprise methyl.

In another embodiment, n is an integer between 1 to 8, or in between 1 to 6, or even in between 1 to 4 in the general formula (I)(a).

In another embodiment, x and y are, independent of each other, an integer in between 1 to 10000, or in between 1 to 5000, or in between 1 to 1000, or in between 1 to 500, or in between 10 to 500, or even in between 10 to 250, or even still in between 10 to 100 in general formula (1) (a).

In the present context, the concatenations denoted by x and y are distributed to form a block polymeric structure or a random polymeric structure, as is understood by the person skilled in the art.

In another embodiment, the non-ionic surfactant comprises a polyether siloxane represented by the general formula (II),

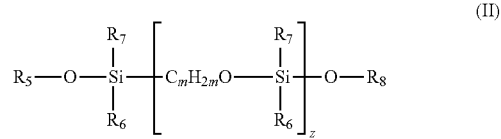

(II)

wherein, $R_5$, $R_6$, R, and $R_8$ is, independent of each other, selected from alkyl, alkenyl, cycloalkyl, aryl, heteroaryl, alkylalkoxy, $R_9$—C(=O)—, $R_{10}$—NH—C(=O)—, $R_{11}Si(R_{12})(R_{13})$—, $R_{14}$—O—(—$R_{15}$—O—)$_j$—($C_nH_{2n}$—)$_k$—;

$R_9$, $R_{10}$, $R_{11}$, $R_{12}$, and $R_{13}$ is, independent of each other, selected from alkyl, alkenyl, cycloalkyl, aryl, heteroaryl, alkylalkoxy;

$R_{14}$ and $R_{15}$ is, independent of each other, selected from bivalent alkylene, cycloalkylene, alkenyl, aryl;

m is an integer in between 1 to 10;

j and k is, independent of each other, an integer in between 0 to 10; and z is an integer in between 1 to 10000.

In one embodiment, the polyether siloxane is represented by the general formula (II)(a),

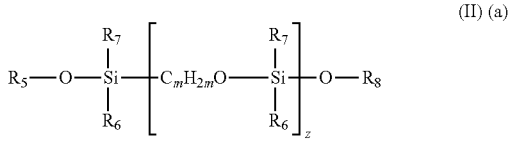

(II) (a)

wherein, $R_5$, $R_6$, $R_7$, and $R_8$ is, independent of each other, selected from alkyl, alkenyl, $R_{14}\text{—}O\text{—}(\text{—}R_{15}\text{—}O\text{—})_j\text{—}(C_nH_{2n}\text{—})_k\text{—}$;

$R_{14}$ and $R_{15}$ is, independent of each other, selected from bivalent alkylene, cycloalkylene, alkenyl, aryl;

m is an integer in between 1 to 10;

j and k is, independent of each other, an integer in between 0 to 10; and z is an integer in between 1 to 10000.

Suitable amounts of these surfactants, as described hereinabove, range in between 0.1 wt.-% to 20 wt.-%, or in between 0.1 wt.-% to 15 wt.-%, or in between 1.0 wt.-% to 10 wt.-%, or even in between 1.0 wt.-% to 5.0 wt.-%, based on the total weight of the isocyanate composition.

In another embodiment, the isocyanate composition, as described hereinabove, further comprises a compatibilizer. Accordingly, in one embodiment, the isocyanate composition comprises:

(a) at least one isocyanate,
(b) a first blowing agent,
(c) at least one surfactant, and
(d) a compatibilizer, wherein the surfactant does not contain any reactive functional group towards NCO and has a Dynamic Surface Tension (DST) in between 40 mN/m to 60 mN/m, when measured at a concentration of 0.1 wt.-% and frequency of 1 Hz in distilled water, and wherein the first blowing agent has a boiling point in between −50° C. to 5° C.

Suitable compounds for use as compatibilizer are preferably flame retardants. In one embodiment, the compatibilizer comprises a phosphorus compound, a nitrogen compound or a mixture thereof.

In one embodiment, the compatibilizer comprises the phosphorus compound. In another embodiment, the compatibilizer consists of the phosphorus compound. Suitable phosphorus compounds comprise one or more selected from tris(2-chloroethyl)phosphate (TCEP), tris(2-chloropropyl) phosphate (TCPP), tris(2,3-dibromopropyl)phosphate, tris (1,3-dichloropropyl)phosphate, tris(2-chloroisopropyl) phosphate, tricresylphosphate, tri(2,2-dichloroisopropyl) phosphate, diethylN,N-bis(2-hydryethyl) aminomethylphosphonate, dimethyl methylphosphonate, tri (2,3-dibromopropyl)phosphate, tri(1,3-dichloropropyl) phosphate, tetra-kis-(2-chloroethyl)ethylene diphosphate, triethylphosphate, diammonium phosphate, diethyl ethanephosphonate (DEEP), triethyl phosphate (TEP), dimethyl propanephosphonate (DMPP) and diphenyl cresyl phosphate (DPK). In another embodiment, the phosphorus compounds comprise one or more selected from TCPP, DEEP, TEP, DMPP and DPK. In still other embodiment, the phosphorus compounds comprise one or more selected from TCPP, DEEP and TEP. In still another embodiment, the phosphorus compound comprises TCPP. In yet another embodiment, the phosphorus compound is TCPP.

In another embodiment, the nitrogen compounds comprise one or more selected from ben-zoguanamine, tris (hydroxyethyl)isocyanurate, isocyanurate, allantoin, glycoluril, melamine, melamine cyanurate, melamine polyphosphate, dimelamine phosphate, melamine pyrophosphate, melamine borate, ammonium polyphosphate, melamine ammonium polyphosphate, melamine ammonium pyrophosphate, condensation product of melamine selected from the group consisting of melem, melam, melon and higher condensed compounds and other reaction products of melamine with phosphoric acid and melamine derivatives.

Suitable amounts of these compatibilizers, as described hereinabove, range in between 0.1 wt.-% to 20 wt.-%, or in between 0.1 wt.-% to 15 wt.-%, or in between 1.0 wt.-% to 10 wt.-%, or even in between 1.0 wt.-% to 5.0 wt.-%, based on the total weight of the isocyanate composition.

In one embodiment, the isocyanate composition consists of:

(a) at least one isocyanate,
(b) a first blowing agent,
(c) at least one surfactant, and
(d) a compatibilizer wherein the surfactant does not contain any reactive functional group towards NCO and has a Dynamic Surface Tension (DST) in between 40 mN/m to 60 mN/m, when measured at a concentration of 0.1 wt.-% and frequency of 1 Hz in distilled water, and wherein the first blowing agent has a boiling point in between −50° C. to 5° C.

In one embodiment, the isocyanate composition comprises:

(a) at least one isocyanate,
(b) a first blowing agent, and
(c) at least polyether polysiloxane represented by the general formula (I),

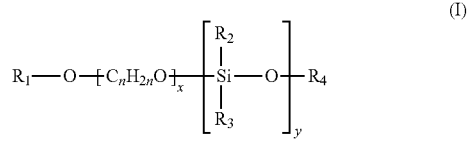

(I)

wherein, $R_1$, $R_2$, $R_3$ and $R_4$ is, independent of each other, selected from unsubstituted alkyl, alkenyl, cycloalkyl, aryl, heteroaryl, alkylalkoxy, $R_9\text{—}C(\!=\!O)\text{—}$, $R_{10}\text{—}NH\text{—}C(\!=\!O)\text{—}$, $R_{11}Si(R_{12})(R_{13})\text{—}$, $R_{14}\text{—}O\text{—}(\text{—}R_{15}\text{—}O\text{—})_j\text{—}(C_nH_{2n}\text{—})_k\text{—}$;

$R_9$, $R_{10}$, $R_{11}$, $R_{12}$, and $R_{13}$ is, independent of each other, selected from alkyl, alkenyl, cycloalkyl, aryl, heteroaryl, alkylalkoxy;

$R_{14}$ and $R_{15}$ is, independent of each other, selected from bivalent alkylene, cycloalkylene, alkenyl, aryl;

n is an integer in between 1 to 10;

j and k is, independent of each other, an integer in between 0 to 10; and x and y is, independent of each other, an integer in between 1 to 10000.

wherein the surfactant does not contain any reactive functional group towards NCO and has a Dynamic Surface Tension (DST) in between 40 mN/m to 60 mN/m, when measured at a concentration of 0.1 wt.-% and frequency of 1 Hz in distilled water.

The isocyanate composition, as described hereinabove, is storage stable and advantageously has an acceptable shelf life of more than six months.

Another aspect of the presently claimed invention is directed towards a PU foam obtained by reacting:

(A) the above defined isocyanate composition, and
(B) a polyol composition, in the presence of (C) a second blowing agent, and (D) at least one catalyst.

In an embodiment, the polyol composition comprises at least one polyol. Suitable polyols for the purpose of the presently claimed invention have an average functionality in between 2.0 to 8.0 and a hydroxyl number in between 15 mg KOH/g to 1800 mg KOH/g. In one embodiment, the polyols have an average functionality in between 2.0 to 6.0 and a hydroxyl number in between 15 mg KOH/g to 1500 mg KOH/g. It is also possible to use chain extenders or cross-linking agents alongside the polyols as well.

Suitable amounts of the isocyanate composition and the polyol composition are selected such that the isocyanate index is in between 70 to 350, or in between 80 to 300, or in between 90 to 200, or even in between 100 to 150. In the present context, an isocyanate index of 100 corresponds to one isocyanate group per one isocyanate reactive group.

In one embodiment, the polyol comprises polyether polyols, polyester polyols, polyether-ester polyols or a combination thereof.

Suitable polyether polyols are obtained by known processes, for example via anionic polymerization of alkylene oxides with the addition of at least one starter molecule comprising from 2 to 8, or 2 to 6, reactive hydrogen atoms, in the presence of catalysts. If mixtures of starter molecules with different functionality are used, fractional functionalities can be obtained. The nominal functionality ignores effects on the functionality due to side reactions. The catalysts can be alkali metal hydroxides, for example sodium hydroxide or potassium hydroxide, or alkali metal alcoholates, for example sodium methanolate, sodium ethanolate or potassium ethanolate or potassium isopropanolate, or in the case of a cationic polymerization, the catalysts can be Lewis acids, for example antimony pentachloride, boron trifluoride etherate or bleaching earth. It is also possible to use aminic alkoxylation catalysts, for example dimethylethanolamine (DMEOA), imidazole and imidazole derivatives. The catalysts can moreover also be double-metal cyanide compounds, which are known as DMC catalysts.

The alkylene oxides are one or more compounds having from 2 to 4 carbon atoms in the alkylene moiety, for example tetrahydrofuran, propylene 1,2-oxide, ethylene oxide, or butylene 1,2- or 2,3-oxide, in each case alone or in the form of a mixture. In one embodiment, the alkylene oxide comprises ethylene oxide and/or propylene 1,2-oxide.

Starter molecules that can be used are compounds containing hydroxyl groups or containing amine groups, for example ethylene glycol, diethylene glycol, glycerol, trimethylolpropane, pentaerythritol, sugar derivatives, for example sucrose, hexitol derivatives, for example sorbitol, methylamine, ethylamine, isopropylamine, butylamine, benzylamine, aniline, toluidine, toluenediamine (TDA), naphthylamine, ethylenediamine, diethylenetriamine, 4,4'-methylenedianiline, 1,3,-propanediamine, 1,6-hexanediamine, ethanolamine, diethanolamine, triethanolamine, and also other di- or polyhydric alcohols or mono- or polyfunctional amines.

These high-functionality compounds are solid under the usual alkoxylation reaction conditions, and it is therefore usual to alkoxylate these together with co-initiators. Examples of suitable co-initiators are water, polyhydric lower alcohols, e.g. glycerol, trimethylolpropane, pentaerythritol, diethylene glycol, ethylene glycol, propylene glycol and homologs of these.

Examples of other co-initiators that can be used are: organic fatty acids, fatty acid monoesters and fatty acid methylesters, for example oleic oil, stearic acid, methyl oleate, methyl stearate or biodiesel, where these serve to improve blowing agent solubility during the production of PU foams.

Suitable starter molecules for the production of polyether polyols comprise sorbitol, sucrose, ethylenediamine, TDA, trimethylolpropane, pentaerythritol, glycerol, biodiesel, diethylene glycol or a mixture thereof. In one embodiment, the starter molecules comprise sucrose, glycerol, biodiesel, pentaerythritol, ethylenediamine or a mixture thereof.

The average functionality of the polyether polyols, as described hereinabove, is in between 2.0 to 6.0, or in between 2.5 to 5.5, with the hydroxyl number in between 100 mg KOH/g to 1200 mg KOH/g, or in between 200 mg KOH/g to 1000 mg KOH/g, or even in between 350 mg KOH/g to 800 mg KOH/g.

Suitable polyester polyols have an average functionality in between 2.0 to 6.0 with the hydroxyl number in between 30 mg KOH/g to 500 mg KOH/g. These polyols are based on the reaction product of carboxylic acids or anhydrides with hydroxyl group containing compounds.

Suitable carboxylic acids or anhydrides have preferably from 2 to 20 carbon atoms, or from 4 to 18 carbon atoms, for example succinic acid, glutaric acid, adipic acid, suberic acid, azelaic acid, sebacic acid, decanedicarboxylic acid, maleic acid, fumaric acid, phthalic acid, isophthalic acid, terephthalic acid, oleic acid, phthalic anhydride.

Suitable hydroxyl-containing compounds comprise one or more selected from ethanol, ethylene glycol, propylene-1,2-glycol, propylene-1,3-glycol, butyl-ene-1,4-glycol, butylene-2,3-glycol, hexane-1,6-diol, octane-1,8-diol, neopentyl glycol, cyclohexane dimethanol (1,4-bis-hydroxy-methylcyclohexane), 2-methyl-propane-1,3-diol, glycerol, trimethylolpropane, hexane-1,2,6-triol, butane-1,2,4-triol, trimethylolethane, pentaerythritol, quinitol, mannitol, sorbitol, methyl glycoside, diethylene glycol, triethylene glycol, tetraethylene glycol, polyethylene glycol, dipropylene glycol, polypropylene glycol, polyethylene-propylene glycol, dibutylene glycol and polybutylene glycol. In one embodiment, the hydroxyl-containing compounds comprise one or more selected from ethylene glycol, propylene-1,2-glycol, propylene-1,3-glycol, butyl-ene-1,4-glycol, butylene-2,3-glycol, hexane-1,6-diol, octane-1,8-diol, neo-pentyl glycol, cyclohexane dimethanol (1,4-bis-hydroxy-methylcyclohexane), 2-methyl-propane-1,3-diol, glycerol, trimethylolpropane, hexane-1,2,6-triol, butane-1,2,4-triol, trimethylolethane, pentaerythritol, quinitol, mannitol, sorbitol, methyl glycoside and diethylene glycol.

The polyether-ester polyols have preferably a hydroxyl number in between 100 mg KOH/g to 460 mg KOH/g, or in between 150 mg KOH/g to 450 mg KOH/g, or in between 250 mg KOH/g to 430 mg KOH/g, with the average functionality in between 2.3 to 5.0, or in between 3.5 to 4.7.

Such polyether-ester polyols are obtainable as a reaction product of i) at least one hydroxyl-containing starter molecule; ii) of one or more fatty acids, fatty acid monoesters or mixtures thereof; iii) of one or more alkylene oxides having 2 to 4 carbon atoms.

The starter molecules of component i) are generally selected such that the average functionality of component i) is in between 3.8 to 4.8, or in between 4.0 to 4.7, or even in between 4.2 to 4.6. Optionally, a mixture of suitable starter molecules is used.

In one embodiment the hydroxyl-containing starter molecules of component i) comprise one or more of sugars and sugar alcohols (glucose, mannitol, sucrose, pentaerythritol, sorbitol), polyhydric phenols, resols, e.g., oligomeric condensation products formed from phenol and formaldehyde, trimethylolpropane, glycerol, glycols such as ethylene glycol, propylene glycol and their condensation products such as polyethylene glycols and polypropylene glycols, e.g., diethylene glycol, triethylene glycol, dipropylene glycol, and water.

In one embodiment, the component i) comprises sugars and sugar alcohols such as sucrose and sorbitol, glycerol, and mixtures of said sugars and/or sugar alcohols with glycerol, water and/or glycols such as, for example, diethylene glycol and/or dipropylene glycol. In other embodiment, a mixture of sucrose with one or more than one compound selected from glycerol, diethylene glycol and dipropylene glycol can also be used. In another embodiment, the component i) comprises sucrose and glycerol.

Said fatty acid or fatty acid monoester ii) comprises one or more polyhydroxy fatty acids, ricinoleic acid, hydroxyl-modified oils, hydroxyl-modified fatty acids and fatty acid esters based in myristoleic acid, palmitoleic acid, oleic acid, stearic acid, palmitic acid, vaccenic acid, petroselic acid, gadoleic acid, erucic acid, nervonic acid, linoleic acid, a- and g-linolenic acid, stearidonic acid, arachidonic acid, timnodonic acid, clupanodonic acid and cervonic acid. The fatty acid methyl esters comprise fatty acid monoesters. In one embodiment, fatty acids are stearic acid, palmitic acid, linolenic acid and especially oleic acid, monoesters thereof, and mixtures thereof.

Biodiesel is to be understood as meaning fatty acid methyl esters within the meaning of the EN 14214 standard from 2010. Principal constituents of biodiesel, which is generally produced from rapeseed oil, soybean oil or palm oil, are methyl esters of saturated $C_{16}$ to $C_{18}$ fatty acids and methyl esters of mono- or polyunsaturated $C_{18}$ fatty acids such as oleic acid, linoleic acid and linolenic acid.

Suitable alkylene oxides iii) having 2 to 4 carbon atoms are, for example, ethylene oxide, propylene oxide, tetrahydrofuran, 1,2-butylene oxide, 2,3-butylene oxide and/or styrene oxide. Alkylene oxides can be used singly, alternatingly in succession or as mixtures.

In an embodiment, alkylene oxides iii) are propylene oxide and ethylene oxide. In another embodiment, alkylene oxides iii) comprise a mixture of ethylene oxide and propylene oxide having more than 50 wt.-% of propylene oxide. In yet another embodiment, pure propylene oxide can also be employed.

Chain extenders and/or crosslinking agents, if present, can modify the mechanical properties of the PU foam, e.g. the hardness. The chain extenders and/or crosslinking agents comprise diols and/or triols, and also amino alcohols with a molecular weight of less than 399 g/mol, or in between 49 g/mol to 399 g/mol, or even in between 60 g/mol to 300 g/mol. Examples of compounds that can be used are aliphatic, cycloaliphatic and/or araliphatic diols having from 2 to 8, or 2 to 6, carbon atoms, for example ethylene glycol, propylene 1,2-glycol, diethylene glycol, dipropylene glycol, 1,3-propanediol, 1,4-butanediol, 1,6-hexanediol, o-, m-, p-dihydroxycyclohexane and bis(2-hydroxyethyl)hydroquinone. It is equally possible to use aliphatic and cycloaliphatic triols, for example glycerol, trimethylolpropane and 1,2,4- and 1,3,5-trihydroxycyclohexane.

Insofar as chain extenders, crosslinking agents or mixtures thereof are used for the production of PU foams, the quantity used of these is advantageously from 0 wt.-% to 15 wt.-%, or in between 0 wt.-% to 5 wt.-%, based on the total weight of the PU foam.

Suitable second blowing agents comprise one or more of water, hydrocarbons, hydrofluorocarbons, hydrofluoroolefins, hydrochlorofluorocarbons, fluorocarbons, dialkyl ethers, cycloalkylene ethers and ketones and fluorinated ethers.

The hydrocarbons, hydrochlorofluorocarbons, fluorocarbons, dialkyl ether, cycloalkylene ethers and ketones and fluorinated ethers that can be used as second blowing agents are described hereinabove.

In one embodiment, the second blowing agent has a boiling point in between 15° C. to 125° C., or in between 15° C. to 100° C., or in between 15° C. to 50° C., or even in between 15° C. to 25° C.

Suitable HFOs as second blowing agents comprise one or more selected from 1,1,1,3-tetrafluoropropene, 1,1,1,3-tetrafluoropropene, 1,1,1-trifluoro-2-chloropropene, 1-chloro-3,3,3-trifluoropropene, 1,1,1,2,3-pentafluoropropene, 1,1,1,4,4,4-hexafluorobutene, 1-bromopentafluoropropene, 2-bromopentafluoropropene, 3-bromopentafluoropropene, 1,1,2,3,3,4,4-heptafluoro-1-butene, 3,3,4,4,5,5,5-heptafluoro-1-pentene, 1-bromo-2,3,3,3-tetrafluoropropene, 2-bromo-1,3,3,3-tetrafluoropropene, 3-bromo-1,1,3,3-tetrafluoropropene, 2-bromo-3,3,3-trifluoropropene, E-1-bromo-3,3,3-trifluoropropene, 3,3,3-trifluoro-2-(trifluoromethyl)propene, 1-chloro-3,3,3-trifluoropropene, 2-chloro-3,3,3-trifluoropropene and 1,1,1-trifluoro-2-butene, in cis or trans form.

In one embodiment, the HFOs comprise one or more selected from 1,1,2,3,3,4,4-heptafluoro-1-butene, 3,3,4,4,5,5,5-heptafluoro-1-pentene, 1-bromo-2,3,3,3-tetrafluoropropene, 2-bromo-1,3,3,3-tetrafluoropropene, 3-bromo-1,1,3,3-tetrafluoropropene, 2-bromo-3,3,3-trifluoropropene, E-1-bromo-3,3,3-trifluoropropene, 3,3,3-trifluoro-2-(trifluoromethyl)propene, 1-chloro-3,3,3-trifluoropropene, 2-chloro-3,3,3-trifluoropropene and 1,1,1-trifluoro-2-butene, in cis or trans form. In another embodiment, the HFOs comprise one or more of 3-bromo-1,1,3,3-tetrafluoropropene, 2-bromo-3,3,3-trifluoropropene, E-1-bromo-3,3,3-trifluoropropene, 3,3,3-trifluoro-2-(trifluoromethyl)propene, 1-chloro-3,3,3-trifluoropropene, 2-chloro-3,3,3-trifluoropropene and 1,1,1-trifluoro-2-butene, in cis or trans form.

In another embodiment, the HFOs comprise one or more selected from 3,3,3-trifluoro-2-(trifluoromethyl)propene, 1-chloro-3,3,3-trifluoropropene, 2-chloro-3,3,3-trifluoropropene and 1,1,1-trifluoro-2-butene, in cis or trans form. In yet another embodiment, the HFOs comprise one or more of 1-chloro-3,3,3-trifluoropropene, 2-chloro-3,3,3-trifluoropropene and 1,1,1-trifluoro-2-butene, in cis or trans form.

In still another embodiment, the second blowing agent is trans-1-chloro-3,3,3-trifluoropropene, also known as HFO-1233zd(E). HFO-1233zd(E) is commercially available under the tradename Solstice® from Honeywell.

Suitable amounts of the second blowing agent are in between 1.0 wt.-% to 30 wt.-%, or in between 1.5 wt.-% to 20 wt.-%, or in between 3.0 wt.-% to 15 wt.-%, or in between 3.0 wt.-% to 15 wt.-%, or even in between 3.0 wt.-% to 10 wt.-%, based on the total weight of the PU foam.

The catalysts are in particular compounds which accelerate the reaction between the reactive hydrogen atoms, in particular hydroxyl group¥s, with the isocyanates.

It is advantageous to use basic polyurethane catalysts, for example tertiary amines, such as triethylamine, tributylamine, dimethylbenzylamine, dicyclohexylmethylamine, dimethylcyclohexylamine, N,N,N',N'-tetramethyldiaminodiethyl ether, bis(dimethylaminopropyl) urea, N-methyl- and N-ethylmorpholine, N-cyclohexylmorpholine, N,N,N',N'-tetramethylethylenediamine, N,N,N,N-tetramethylbutanediamine, N,N,N,N-tetramethylhexane-1,6-diamine, pentamethyldiethylenetriamine, bis(2-dimethylaminoethyl) ether, dimethylpiperazine, N-dimethylaminoethylpiperidine, 2,2'-dimethyl bis(p-aminocyclohexyl)methane (DMDC), 1,2-dimethylimidazol, 1-azabicyclo[2.2.0]octane, 1,4.diazabicyclo[2.2.2]octane (Dabco) and alkanolamine compounds, for example triethanolamine, triisopropanolamine, N-methyl- and N-ethyldiethanolamine, dimethylaminoethanol, 2-(N,N-dimethylaminoethoxy)ethanol, N,N',N''-tris(dialkylamino-alkyl)hexahydrotriazines, e.g. N,N',N''-tris(dimethylamino-propyl)-s-hexahydrotriazine, and triethylenediamine. However, metal salts are also suitable, for example iron(II) chloride, zinc chloride, lead octanoate and preferably tin salts, for example tin dioctanoate, tin diethylhexoate and dibutyltin dilaurate, and also in particular mixtures of tertiary amines and organic tin salts.

Other catalysts that can be used are: amidines, for example 2,3-dimethyl-3,4,5,6-tetrahydropyrimidine, tetraalkylammonium hydroxides, such as tetramethylammonium hydroxides, alkali metal hydroxides metal, such as sodium hydroxide and alkali metal alcoholates, such as sodium methanolate and potassium isopropanolate, alkali metal carboxylates, and also alkali metal salts of long-chain fatty acids having from 10 to 20 carbon atoms and optionally having pendant OH groups.

Other catalysts that can be used are incorporable amines, i.e. amines having an OH, NH or $NH_2$ function, for example ethylenediamine, triethanolamine, diethanolamine, ethanolamine and dimethylethanolamine.

In an embodiment, the amount of catalysts is in between 0.001 wt.-% to 10 wt.-%, or in between 0.01 wt.-% to 8 wt.-%, or even in between 0.1 wt.-% to 5 wt.-%, based on the total weight of the PU foam.

In another embodiment, the PU foam further comprises at least one additive. Additives, if present, comprise one or more selected from alkylene carbonates, carbonamides, pyrrolidones, flame retardants, surfactants, dyes, pigments, IR absorbing materials, UV stabilizers, plasticizers, antistats, fungistats, bacterio-stats, hydrolysis controlling agents, curing agents, antioxidants and cell regulators. These additives can be present in an amount in between 0.1 wt.-% to 30 wt.-%. Further details regarding these additives can be found, for example, in Kunststoffhandbuch, Volume 7, "Polyurethane" Carl-Hanser-Verlag Munich, $1^{st}$ edition, 1966, $2^{nd}$ edition, 1983 and $3^{rd}$ edition, 1993.

The PU foam, as obtained hereinabove, does not collapse and is dimensionally stable. Dimensional stability of the PU foam is determined by measuring volume change of a PU foam sample after exposure to various temperatures and humidity for a set period of time. For instance, this can be done by measuring a foam cube after exposure to 93.33° C. dry heat, 70° C. at 95% relative humidity and −28.89° C. The volume change of the sample is then measured after 1, 2, 7, 14, and 28 days and recorded.

Another aspect of the presently claimed invention is directed to a process for preparing the PU foam, as described hereinabove.

For the purpose of the presently claimed invention, the term "polyurethane-forming composition" refers to the isocyanate composition, the polyol composition, the second blowing agent, the catalysts, optionally the chain extenders and/or crosslinking agents and/or the additives, as described hereinabove. In an embodiment, these components are brought together at room temperature to conduct the reaction. It is usually not necessary to apply heat to the composition to drive the cure, but this may be done too, if desired. By the term "room temperature", it is referred to a temperature of 25° C.

The polyurethane-forming composition, as described hereinabove, can be employed for pourin-place applications or spray applications. In one embodiment, the polyurethane-forming composition is useful for pour-in-place applications, in which the polyurethane-forming composition is dispensed into a cavity and foams within the cavity to fill it and provide structural and/or thermal insulative attributes to an assembly. The term "pour-in-place" refers to the fact that the foam is created at the location, where it is needed, rather than being created in one step and later assembled into place in a separate manufacturing step. Further, the term "cavity" refers to an empty or hollow space of any geometry having at least one open side into which the polyurethane-forming composition can be dispensed at conditions such that expansion and curing of the composition occurs to form the PU foam. Suitable examples of cavities are, such as but not limited to, empty or hollow spaces in pipes, refrigerators, freezers and insulation boards.

In another embodiment, the polyurethane-forming composition is useful for spray applications. Spraying techniques are used for filling molds and panels and for applying the polyurethane-forming composition to plane surfaces. Spraying is particularly useful in applications, where large areas are involved, such as tanks or building walls. Sprayed PU foam coatings provide both physical strength and improved insulation. In spray applications, the mixing of the components of the polyurethane-forming composition is accomplished by atomization. By the term "atomization", it is referred to the particles or droplets of the polyurethane-forming composition obtained from suitable spraying means, such as not limited to, a nozzle or an atomizer.

Another aspect of the presently claimed invention is directed to a reinforced PU foam obtained by reacting:

(A) the above defined isocyanate composition, and (B) the above defined polyol composition, in the presence of a reinforcing agent.

The isocyanate composition and the polyol composition that are used in the reinforced PU foam are described hereinabove. In one embodiment, the reinforced PU foam formation takes place in the presence of one or more of the second blowing agents, the catalysts and the additives, as described hereinabove.

Suitable reinforcing agents comprise one or more selected from metal fiber, metalized inorganic fiber, metalized synthetic fiber, glass fiber, polyester fiber, polyamide fiber, graphite fiber, carbon fiber, ceramic fiber, mineral fiber, basalt fiber, inorganic fiber, aramid fiber, kenaf fiber, jute fiber, flax fiber, hemp fiber, cellulosic fiber, sisal fiber and coir fiber.

The reinforcing agents, as described hereinabove, can be incorporated by any method known to the person skilled in the art. For instance, the reinforcing agent can be impregnated to the polyurethane-forming composition, as described hereinabove. Additionally, the reinforcing agent can be continuous or chopped or in any shape and size depending upon the application of the reinforced PU foam. For instance, in construction or automotive applications, reinforcing agent can be impregnated as fiber stacks or fiber mats having an area weight preferably in between 100 $g/m^2$ to 1500 $g/m^2$.

Another aspect of the presently claimed invention describes a process for producing a spray PU foam comprising the steps of:

(S1) spraying a reaction mixture comprising:
(i) the above defined isocyanate composition, and
(ii) a resin mixture comprising the above defined polyol composition,
and
(S2) allowing the reaction mixture to react.

The isocyanate composition and the polyol composition that are used in the spray PU foam are described hereinabove.

In one embodiment, the resin mixture further comprises one or more selected from the second blowing agents, the catalysts and the additives, as described hereinabove.

Suitable means for storing the isocyanate composition and the resin mixture, as described hereinabove, are well known to the person skilled in the art. However, in one embodiment, the isocyanate composition and the resin mixture are each stored separately in pressurized vessels. By the term "pressurized vessel", it is referred to storage vessels, wherein pressure conditions suitable to handle the low boiling compounds, for instance the isocyanate composition comprising the low boiling first blowing agents, prevail. This is typically a pressure of at least 0.01 MPa, or in between 0.01 MPa to 5 MPa, or in between 0.1 MPa to 4 MPa, or even in between 0.1 MPa to 3 MPa at room temperature.

For the purpose of the presently claimed invention, each of the isocyanate composition and the resin mixture comprising the polyol composition is fed as a separate stream, for instance, in a mixing device prior to spraying. In one embodiment, the presently claimed invention refers to the two-component system, as described hereinabove. However, it is possible that a multicomponent system can also be used. By the term "multicomponent system", it is referred to any number of streams, at least more than the conventionally existing two streams in the two-component system. For example, three, four, five, six or seven, separate streams can be fed to the mixing device. These additional streams can comprise one or more selected from the isocyanates, the first blowing agents, the surfactants, the compatibilizers, the polyols, the second blowing agents, the catalysts and additives, as described hereinabove. In one embodiment, each of the streams in the multicomponent system is different from the isocyanate composition and the resin mixture, as described hereinabove.

Suitable mixing devices for the purpose of the presently claimed invention are well known to the person skilled in the art, for example, a mixing head or a static mixer. While it is preferred that each stream enters separately in the mixing device, it is possible that the components within each stream are well mixed by suitable mixing means, for example, the static mixer.

Moreover, the mixing can be continuous or discontinuous, depending on the final application of the PU foam.

Static mixers are well known to the person skilled in the art for mixing of liquids, for example, as described in EP 0 097 458. Typically, the static mixers are tubular apparatuses with fixed internals which serve for the mixing of individual stream across the cross section of the tube.

Static mixers can be used in continuous process for the conduct of various operations, for example, mixing, substance exchange between two phases, chemical reactions or heat transfer. The homogenization of the streams is brought about via a pressure gradient produced by means of a pump.

The mixing device, as described hereinabove, can be a low pressure or a high pressure mixing device comprising:
pumps to feed the streams,
a high pressure mixing head in which the streams are mixed,
a first feed line fitted to the mixing head through which a first stream comprising the isocyanate composition is introduced into the mixing head, and
a second feed line fitted to the mixing head through which a second stream comprising the resin mixture is introduced into the mixing head.

Optionally, the mixing device, as described hereinabove, can further comprise at least one measurement and control unit for establishing the pressures of each of the feed lines in the mixing head. Also, the term "low pressure" here refers to a pressure in between 0.1 MPa to 5 MPa, while the term "high pressure" refers to pressure above 5 MPa.

The reaction mixture obtained from the mixing device is fed to the spraying means. Suitable spraying means for the purpose outlined herein include, but are not limited to, a spray head.

In an embodiment, the spray head for spraying the reaction mixture of step (S1) comprises at least one polyurethane spray jet. The polyurethane spray jet essentially consists of fine particles or droplets of the reaction mixture, preferably dispersed in a gas stream. Such a polyurethane spray jet can be obtained in different ways, for example, by atomizing a liquid jet of the reaction mixture by the gas stream introduced into it, or by the ejection of a liquid jet of the reaction mixture from a corresponding nozzle or atomizer. By the term "liquid jet of the reaction mixture", it is referred to the fluid jet of the reaction mixture that is not yet in the form of fine reaction mixture droplets dispersed in a gas stream, i.e. especially in a liquid viscous phase. Thus, in particular, such a "liquid jet of the reaction mixture" does not mean a polyurethane spray jet, as described above. Such methods are described, for example in, DE 10 2005 048 874 A1, DE 101 61 600 A1, WO 2007/073825 A2, U.S. Pat. No. 3,107, 057 A and DE 1 202 977 B, all incorporated herein by reference.

In one embodiment, the isocyanate composition has a viscosity at 25° C. in between 50 mPas to 700 mPas, or in between 100 mPas to 500 mPas, or in between 100 mPas to 300 mPas, or even in between 100 mPas to 200 mPas.

In another embodiment, the resin mixture has a viscosity at 25° C. in between 50 mPas to 700 mPas, or in between 100 mPas to 700 mPas, or in between 200 mPas to 700 mPas, or even in between 300 mPas to 600 mPas.

The person skilled in the art is aware of methods for appropriate adjustment of the viscosity of the isocyanate composition and the resin mixture, as described hereinabove. This can, for example, be achieved via the selection of lower-viscosity starting materials or addition of known viscosity reducers.

Although, suitable amounts of isocyanates and polyols for PU foam formation are well known to the person skilled in the art, it is preferred that the amounts of the isocyanate composition and the resin mixture is such that the isocyanate index is in between 70 to 350, or in between 80 to 300, or in between 90 to 200, or even in between 100 to 150.

Yet another aspect of the presently claimed invention describes the use of the spray PU foam, as described hereinabove, in an article. Such articles can have any shape and size.

Still another aspect of the presently claimed invention describes an article comprising the spray polyurethane, as described hereinabove.

The presently claimed invention is illustrated in more detail by the following embodiments and combinations of embodiments which result from the corresponding dependency references and links:

1. An isocyanate composition comprising:
   (a) at least one isocyanate,
   (b) a first blowing agent, and
   (c) at least one surfactant,
   wherein the surfactant does not contain any reactive functional group towards NCO and has a Dynamic Surface Tension (DST) in between 40 mN/m to 60 mN/m, when measured at a concentration of 0.1 wt.-% and frequency of 1 Hz in distilled water.
2. The composition according to embodiment 1, wherein the isocyanate is selected from aromatic isocyanate or aliphatic isocyanate or a combination thereof.
3. The composition according to embodiment 2, wherein the aromatic isocyanate comprises one or more of toluene diisocyanate; polymeric toluene diisocyanate, methylene diphenyl diisocyanate; polymeric methylene diphenyl diisocyanate; m-phenylene diisocyanate; 1,5-naphthalene diisocyanate; 4-chloro-1; 3-phenylene diisocyanate; 2,4,6-toluylene triisocyanate, 1,3-diisopropylphenylene-2,4-diisocyanate; 1-methyl-3,5-diethylphenylene-2,4-diisocyanate; 1,3,5-triethylphenylene-2,4-diisocyanate; 1,3,5-triisoproply-phenylene-2,4-diisocyanate; 3,3'-diethyl-bisphenyl-4,4'-diisocyanate; 3,5,3',5'-tetraethyl-diphenylmethane-4,4'-diisocyanate; 3,5,3',5'-tetraisopropyldiphenylmethane-4,4'-diisocyanate; 1-ethyl-4-ethoxy-phenyl-2,5-diisocyanate; 1,3,5-triethyl benzene-2,4,6-triisocyanate; 1-ethyl-3,5-diisopropyl benzene-2,4,6-triisocyanate, tolidine diisocyanate, 1,3,5-triisopropyl benzene-2,4,6-triisocyanate and mixtures thereof.
4. The composition according to embodiment 3, wherein the aromatic isocyanate is methylene diphenyl diisocyanate and/or polymeric methylene diphenyl diisocyanate.
5. The composition according to embodiment 2, wherein the aliphatic isocyanate comprise one or more of tetramethylene 1,4-diisocyanate, pentamethylene 1,5-diisocyanate, hexamethylene 1,6-diisocyanate, decamethylene diisocyanate, 1,12-dodecane diisocyanate, 2,2,4-trimethyl-hexamethylene diisocyanate, 2,4,4-trimethyl-hexamethylene diisocyanate, 2-methyl-1,5-pentamethylene diisocyanate, cyclobutane-1,3-diisocyanate, 1,2-, 1,3- and 1,4-cyclohexane diisocyanates, 2,4- and 2,6-methylcyclohexane diisocyanate, 4,4'- and 2,4'-dicyclohexyldiisocyanates, 1,3,5-cyclohexane triisocyanates, isocyanatomethylcyclohexane isocyanates, isocyanatoethylcyclohexane isocyanates, bis(isocyanatomethyl)-cyclohexane diisocyanates, 4,4'-diisocyanatodicyclohexylmethane, pentamethylene 1,5-diisocyanate and, isophorone diisocyanate.
6. The composition according to one or more of embodiments 1 to 5, wherein the first blowing agent has a boiling point in between −50° C. to 5° C.
7. The composition according to one or more of embodiments 1 to 6, wherein the first blowing agent comprises one or more of hydrocarbons, hydrofluorocarbons, hydrofluoroolefins, hydrochlorofluorocarbon, fluorocarbon, dialkyl ether, cycloalkylene ethers and ketones and fluorinated ethers.
8. The composition according to one or more of embodiments 1 to 7, wherein the first blowing agent comprises hydrofluoroolefins.
9. The composition according to embodiment 8, wherein the hydrofluoroolefins comprise one or more of 1,1,1,3-tetrafluoropropene, 1,1,1,3-tetrafluoropropene, 1,1,1-trifluoro-2-chloropropene, 1-chloro-3,3,3-trifluoropropene, 1,1,1,2,3-pentafluoropropene, 1,1,1,4,4,4-hexafluorobutene, 1-bromopentafluoropropene, 2-bromopentafluoropropene, 3-bromopentafluoropropene, 1,1,2,3,3,4-heptafluoro-1-butene, 3,3,4,4,5,5,5-heptafluoro-1-pentene, 1-bromo-2,3,3,3-tetrafluoropropene, 2-bromo-1,3,3,3-tetrafluoropropene, 3-bromo-1,1,3,3-tetrafluoropropene, 2-bromo-3,3,3-trifluoropropene, E1-bromo-3,3,3-trifluoropropene, 3,3,3-trifluoro-2-(trifluoromethyl)propene, 1-chloro-3,3,3-trifluoropropene, 2-chloro-3,3,3-trifluoropropene and 1,1,1-trifluoro-2-butene, in cis or trans form.
10. The composition according to embodiment 9, wherein the hydrofluoroolefin is trans-1,3,3,3-tetrafluoropropene (HFO-1234ze(E)).
11. The composition according to one or more of embodiments 1 to 10, wherein the surfactant is a non-ionic surfactant.
12. The composition according to embodiment 11, wherein the non-ionic surfactant comprises of a polyether polysiloxane or a polyether siloxane or a mixture thereof.
13. The composition according to embodiment 12, wherein the non-ionic surfactant comprises a polyether polysiloxane.
14. The composition according to embodiment 13, wherein the polyether polysiloxane is a polyether polysiloxane of general formula (1),

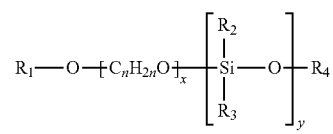

(I)

wherein,
$R_1$, $R_2$, $R_3$ and $R_4$ is, independent of each other, selected from alkyl, alkenyl, cycloalkyl, aryl, heteroaryl, alkylalkoxy, $R_9$—C(=O)—, $R_{10}$—NH—C(=O)—, $R_{11}$Si$(R_{12})(R_{13})$—, $R_{14}$—O—(—$R_{15}$—O—)$_j$—($C_nH_{2n}$—)$_k$—;
$R_9$, $R_{00}$, $R_{11}$, $R_{12}$, and $R_{13}$ is, independent of each other, selected from alkyl, alkenyl, cycloalkyl, aryl, heteroaryl, alkylalkoxy;
$R_{14}$ and $R_{15}$ is, independent of each other, selected from bivalent alkylene, cycloalkylene, alkenyl, aryl;
n is an integer in between 1 to 10;
j and k is, independent of each other, an integer in between 0 to 10; and
x and y is, independent of each other, an integer in between 1 to 10000.
15. The composition according to embodiment 14, wherein the polyether polysiloxane of general formula (I) is a polyether polysiloxane of general formula (1)(a),

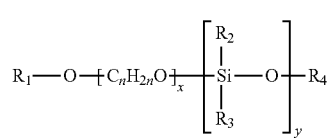

(I) (a)

wherein,
$R_5$, $R_6$, $R_7$, and $R_8$ is, independent of each other, selected from alkyl, alkenyl, $R_{14}$—O—(—$R_{15}$—O—)$_j$—($C_nH_{2n}$—)$_k$—;
$R_{14}$ and $R_{15}$ is, independent of each other, selected from bivalent alkylene, cycloalkylene, alkenyl, aryl;
m is an integer in between 1 to 10;

j and k is, independent of each other, an integer in between 0 to 10; and z is an integer in between 1 to 10000.

16. The composition according to one or more of embodiments 1 to 15 further comprising a compatibilizer.

17. The composition according to embodiment 16, wherein the compatibilizer comprises of a phosphorus compound, nitrogen compound or a mixture thereof.

18. The composition according to embodiment 17, wherein the compatibilizer is a phosphorus compound.

19. The composition according to embodiment 18, wherein the phosphorus compound comprises one or more of tris(2-chloroethyl)phosphate (TCEP), tris(2-chloropropyl)phosphate (TCPP), tris(2,3-dibromopropyl)phosphate, tris(1,3-dichloropropyl)phosphate, tris(2-chloroisopropyl)phosphate, tricresylphosphate, tri(2,2-dichloroisopropyl)phosphate, diethylN,N-bis(2-hydryethyl)aminomethylphosphonate, dimethyl methylphosphonate, tri(2,3-dibromopropyl)phosphate, tri(1,3-dichloropropyl)phosphate, tetra-kis-(2-chloroethyl)ethylene diphosphate, triethylphosphate, diammonium phosphate, diethyl ethanephosphonate (DEEP), triethyl phosphate (TEP), dimethyl propanephosphonate (DMPP) and diphenyl cresyl phosphate (DPK).

20. The composition according to embodiment 19, wherein the phosphorus compound is tris(2-chloropropyl)phosphate (TCPP).

21. A polyurethane foam obtained by reacting:
   (A) an isocyanate composition according to one or more of embodiments 1 to 20, and
   (B) a polyol composition,
   in the presence of
   (C) a second blowing agent, and
   (D) at least one catalyst.

22. The polyurethane foam according to embodiment 21, wherein the polyol composition is at least one polyol having an average functionality in between 2.0 to 8.0 and a hydroxyl number in between 15 mg KOH/g to 1800 mg KOH/g.

23. The polyurethane foam according to embodiment 22, wherein the polyol comprises of polyether polyols, polyester polyols, polyether-ester polyols or a combination thereof.

24. The polyurethane foam according to one or more of embodiments 21 to 23, wherein the second blowing agent has a boiling point in between 15° C. to 125° C.

25. The polyurethane foam according to one or more of embodiments 21 to 24, wherein the second blowing agent comprise one or more of water, hydrocarbon, hydrofluorocarbon, hydrofluoroolefin, hydrochlorofluorocarbon, fluorocarbon, dialkyl ether, cycloalkylene ethers and ketones and fluorinated ethers.

26. The polyurethane foam according to embodiment 25, wherein the second blowing agent comprises of hydrofluoroolefins.

27. The polyurethane according to embodiment 26, wherein the hydrofluoroolefin is trans-1-chloro-3,3,3-trifluoropropene (HFO-1233zd(E)).

28. The polyurethane foam according to one or more of embodiments 21 to 27 further comprising at least one additive.

29. The polyurethane according to embodiment 28, wherein the additive comprises one or more of alkylene carbonates, carbonamides, pyrrolidones, flame retardants, surfactants, dyes, pigments, IR absorbing materials, UV stabilizers, plasticizers, antistats, fungistats, bacteriostats, hydrolysis controlling agents, curing agents, antioxidants and cell regulators.

30. A process for preparing a polyurethane foam according to one or more of embodiments 21 to 29.

31. The process according to embodiment 30, wherein the isocyanate index is in between 70 to 350.

32. A reinforced polyurethane foam obtained by reacting:
   (A) an isocyanate composition according to one or more of embodiments 1 to 20, and
   (B) a polyol composition,
   in the presence of a reinforcing agent.

33. The reinforced polyurethane foam according to embodiment 32, wherein the reinforcing agent comprises one or more of metal fiber, metalized inorganic fiber, metalized synthetic fiber, glass fiber, polyester fiber, polyamide fiber, graphite fiber, carbon fiber, ceramic fiber, mineral fiber, basalt fiber, inorganic fiber, aramid fiber, kenaf fiber, jute fiber, flax fiber, hemp fiber, cellulosic fiber, sisal fiber and coir fiber.

34. A process for producing a spray polyurethane foam comprising the steps of
   (S1) spraying a reaction mixture comprising:
      (i) an isocyanate composition according to one or more of embodiments 1 to 20, and
      (ii) a resin mixture comprising a polyol composition, and
   (S2) allowing the reaction mixture to react.

35. Use of the spray polyurethane foam obtained from the process according to embodiment 34 in an article.

36. An article comprising the spray polyurethane foam obtained from the process according to embodiment 34.

37. An isocyanate composition comprising:
   (a) at least one isocyanate,
   (b) a first blowing agent, and
   (c) at least one surfactant,
   wherein the surfactant does not contain any reactive functional group towards NCO and has a Dynamic Surface Tension (DST) in between 40 mN/m to 60 mN/m, when measured at a concentration of 0.1 wt.-% and frequency of 1 Hz in distilled water, and wherein the first blowing agent has a boiling point in between −50° C. to 5° C.

38. The composition according to embodiment 37, wherein the isocyanate is aromatic isocyanate, aliphatic isocyanate, or a combination thereof.

39. The composition according to embodiment 38, wherein the aromatic isocyanate is methylene diphenyl diisocyanate and/or polymeric methylene diphenyl diisocyanate.

40. The composition according to one or more of embodiments 37 to 39, wherein the first blowing agent comprises hydrofluoroolefins.

41. The composition according to embodiment 40, wherein the hydrofluoroolefin is trans-1,3,3,3-tetrafluoropropene (HFO-1234ze(E)).

42. The composition according to one or more of embodiments 37 to 41, wherein the surfactant is a non-ionic surfactant.

43. The composition according to embodiment 42, wherein the non-ionic surfactant comprises a polyether polysiloxane or a polyether siloxane or a mixture thereof.

44. The composition according to one or more of embodiments 37 to 43 further comprising a compatibilizer.

45. A polyurethane foam obtained by reacting:
   (A) an isocyanate composition according to one or more of embodiments 37 to 44, and
   (B) a polyol composition,
   in the presence of
   (C) a second blowing agent, and
   (D) at least one catalyst.
46. The polyurethane foam according to embodiment 45, wherein the second blowing agent has a boiling point in between 15° C. to 125° C.
47. A process for preparing a polyurethane foam according to embodiment 45 or 46.
48. The process according to embodiment 47, wherein the isocyanate index is in between 70 to 350.
49. A reinforced polyurethane foam obtained by reacting:
   (A) an isocyanate composition according to one or more of embodiments 37 to 44, and
   (B) a polyol composition,
   in the presence of a reinforcing agent.
50. The reinforced polyurethane foam according to embodiment 49, wherein the reinforcing agent comprises one or more of metal fiber, metalized inorganic fiber, metalized synthetic fiber, glass fiber, polyester fiber, polyamide fiber, graphite fiber, carbon fiber, ceramic fiber, mineral fiber, basalt fiber, inorganic fiber, aramid fiber, kenaf fiber, jute fiber, flax fiber, hemp fiber, cellulosic fiber, sisal fiber and coir fiber.
51. A process for producing a spray polyurethane foam comprising the steps of
   (S1) spraying a reaction mixture comprising:
      (i) an isocyanate composition according to one or more of embodiments 37 to 44, and
      (ii) a resin mixture comprising a polyol composition, and
   (S2) allowing the reaction mixture to react.
52. Use of the spray polyurethane foam obtained from the process according to embodiment 51 in an article.
53. An article comprising the spray polyurethane foam obtained from the process according to embodiment 51.

Examples

The presently claimed invention is illustrated by the non-restrictive examples which are as follows:

Compounds

| | POLYOL |
|---|---|
| P1 | Polyether polyol based on sucrose, glycerine and propylene oxide (PO); OH value = 368 mg KOH/g, functionality = 4.5, obtained from BASF |
| P2 | Polyether polyol based on sucrose, glycerine and propylene oxide (PO); OH value = 450 mg KOH/g, functionality = 5.1, obtained from BASF |
| P3 | Polyether polyol based on pentaerythritol and PO; OH value = 555 mg KOH/g, functionality = 4.0, obtained from BASF |
| | ISOCYANATE |
| Iso1 | Polymeric MDI with NCO content of 31.5 wt.-% and functionality = 2.7, obtained from BASF |
| | BLOWING AGENT |
| BA1 | trans-1,1,1,3-tetrafluoropropene (HFO-1234ze(E)) having a boiling point of -18.95° C., obtained from Honeywell |
| BA2 | trans-1-chloro-3,3,3-trifluoropropene (HFO-1233zd(E)) having a boiling point of 19° C., obtained from Honeywell |
| | SURFACTANT |
| S1 | Polyether-polydimethylsiloxane copolymer obtained from Evonik |
| S2 | Organo-silicon copolymer surfactant obtained from Momentive |
| | COMPATIBILIZER |
| C1 | tris(2-chloropropyl)phosphate (TCPP) |
| | ADDITIVE |
| Ad1 | Propylene carbonate |
| Ad2 | Mixture of diethyltoluene diamine, dialkylated phenylenediamine and water as curing agent, obtained from Albemarle |
| | CATALYST |
| Cat1 | Amine based catalyst obtained from Evonik (Dabco T) |
| Cat2 | Solution of potassium octoate in diethylene glycol obtained from Air Products |
| Cat 3 | 2,2'-dimethyl bis(p-aminocyclohexyl)methane (DMDC) |

Analytical Methods Used

Hydroxyl number (OH value) by DIN 53240

Water content by DIN 51777

NCO content by DIN EN ISO 14896

Viscosity determination by ASTM D2196-15 using Brookfield viscometer DV2T, spindle number 2 at 30 rpm.

Cream Time

The time interval between the start of mixing and the point at which the reaction mixture begins to rise.

Gel Time

The time between the start of mixing and the time at which long "strings" or tacky material can be pulled from the interior of the rising mass by inserting and withdrawing a wooden stick.

Full Rise Time

The time between the start of mixing and the completion of expansion of the foaming mass.

Tack Free Time

The time between the start of mixing and the time that the surface of the foam can be touched with a finger or tongue depressor without sticking.

Dimensional Stability

Dimensional stability was determined by measuring volume change of a PU foam sample after exposure to various temperatures and humidity for a set period of time. This was done by measuring the foam cube after exposure to 93.33° C. dry heat, 70° C. at 95% relative humidity and −28.89° C. The volume change of the sample was measured after 1, 2, 7, 14, and 28 days and recorded.

Dynamic Surface Tension (DST)

For the purpose of DST measurements, the surfactant S1 was mixed with distilled water in a SITA Tensiometer. The temperature of the instrument was controlled at 21±1° C. The concentrations was kept at 0.1 wt.-%, 1.0 wt.-% and 100 wt.-%. Bubbles were generated at different bubble frequencies and the difference between the maximum pressures measured inside both bubbles was converted into surface tension. Results at a frequency of 1 Hz are summarized in the table below.

TABLE S

DST values for surfactant S1

| Concentration (wt.-%) | Dynamic Surface Tension at 1 Hz |
|---|---|
| 0.1 | 53.7 |
| 1.0 | 50.2 |
| 100 | 64.6 |

General Synthesis of Isocyanate Composition

The isocyanate composition was obtained by blending the components of Table 1 in the amounts provided therein. This was accomplished by blending the components in a pressurized cylinder. Initial pressure was maintained between 0.01 MPa and 0.21 MPa based on the amount added to the cylinder. The components were added at room temperature and the final pressure was kept greater than 0.21 MPa. After the components were added, the cylinder was rolled for at least 30 minutes. Additional pressure was maintained in the cylinder for foaming. The properties of the isocyanate composition, as obtained, were determined and reported hereinbelow.

TABLE 1 isocyanate composition (IC)

| Component | IC 1 (wt.-%) |
|---|---|
| Iso1 | 88.50 |
| BA1 | 6.50 |
| S1 | 2.0 |
| C1 | 3.0 |
| Properties | |
| Viscosity at 25° C., mPas | 126 |
| Appearance | Dark brown liquid |
| Odour | Slight aromatic |
| Flash Point | >204.44° C. |
| Vapor Pressure, at 20° C. | 0.00016 mm Hg |

The isocyanate composition, IC 1, was used for producing the PU foams for a period of 6 months and beyond. In fact, IC 1 was found to be storage stable for 8 months and did not result in any phase separation.

General Synthesis of PU Foam

The aforementioned IC 1 was used as the isocyanate component or the A-side for producing the spray PU foam. The reaction mixture was obtained by mixing the polyol component or the B-side with the A-side using an Autofroth® equipment from BASF at a temperature of 27° C. The reaction mixture was then processed to obtain the PU foam, as reported in Table 2.

TABLE 2 polyurethane foam

| Component | Example 1 |
|---|---|
| Resin mixture (wt.-%) [B-side] | |
| P1 | 52.0 |
| P2 | 11.0 |
| P3 | 4.40 |
| C1 | 9.0 |
| Cat1 | 0.60 |
| Cat2 | 1.25 |
| Cat3 | 3.0 |
| BA2 | 9.0 |
| Ad1 | 4.0 |
| Ad2 | 2.0 |
| S2 | 2.0 |
| Water | 1.75 |
| Isocyanate composition (wt.-%) [A-side] | |
| IC 1 | 100.0 |
| PU foam | |
| Mixing ratio (A/B ratio), by weight | 100/87 |
| String Gel Time, in s | 85 |
| Tack Free Time, in s | 150 |
| Free Rise Density, in Kg/m$^3$ | 28.03 |

The PU foam, as obtained hereinabove, was dimensionally stable without resulting in any foam collapse. Additionally, there was also no phase separation observed.

The invention claimed is:

1. An isocyanate composition, comprising:
   (a) at least one isocyanate,
   (b) a first blowing agent, and
   (c) at least one surfactant,
   wherein the surfactant does not contain any reactive functional group towards NCO and has a Dynamic Surface Tension (DST) in between 40 mN/m to 60 mN/m, when measured at a concentration of 0.1 wt.-% and frequency of 1 Hz in distilled water, and wherein the first blowing agent has a boiling point in between −50° C. to 5° C., and
   wherein said composition excludes a polyol.

2. The composition according to claim 1, wherein the isocyanate is aromatic isocyanate, aliphatic isocyanate, or a combination thereof.

3. The composition according to claim 2, wherein the aromatic isocyanate is methylene diphenyl diisocyanate and/or polymeric methylene diphenyl diisocyanate.

4. The composition according to claim 1, wherein the first blowing agent comprises a hydrofluoroolefin.

5. The composition according to claim 4, wherein the hydrofluoroolefin is trans-1,3,3,3-tetrafluoropropene (HFO-1234ze(E)).

6. The composition according to claim 1, wherein the surfactant is a non-ionic surfactant.

7. The composition according to claim 6, wherein the non-ionic surfactant comprises a polyether polysiloxane or a polyether siloxane or a mixture thereof.

8. The composition according to claim 1 further comprising a compatibilizer.

9. A process for preparing a polyurethane foam, the process comprising reacting:
   (A) the isocyanate composition according to claim 1, and
   (B) a polyol composition,
   in the presence of
   (C) a second blowing agent, and
   (D) at least one catalyst.

10. The process according to claim 9, wherein the isocyanate index is in between 70 to 350.

11. A process for producing a spray polyurethane foam, comprising:
   (S1) spraying a reaction mixture comprising:
      (i) the isocyanate composition according to claim 1, and
      (ii) a resin mixture comprising a polyol composition, and
   (S2) allowing the reaction mixture to react.

12. The isocyanate composition according to claim 1, wherein said isocyanate composition has a viscosity at 25° C. of between 50 mPas to 700 mPas.

13. The isocyanate composition according to claim 1, wherein said isocyanate composition is phase stable and/or storage stable for at least six months.

* * * * *